Aug. 5, 1969 J. E. ULIN 3,459,319
RELOADING MECHANISM ON ROAD TRANSPORT VEHICLES
FOR STANDARD LOADS
Filed June 23, 1967 10 Sheets-Sheet 1

INVENTOR.
JOHAN EMIL ULIN
BY *Young & Thompson*
ATTYS.

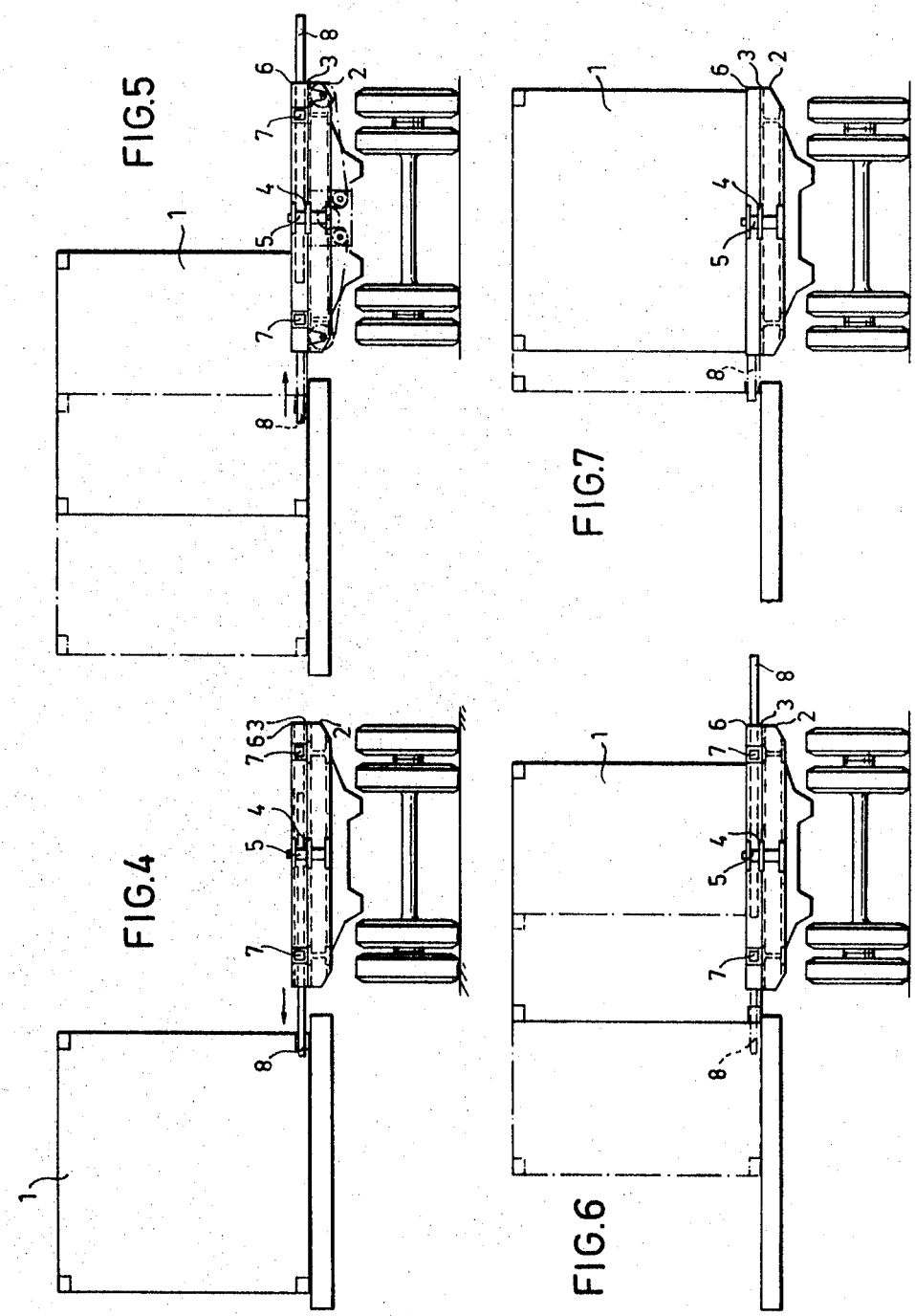

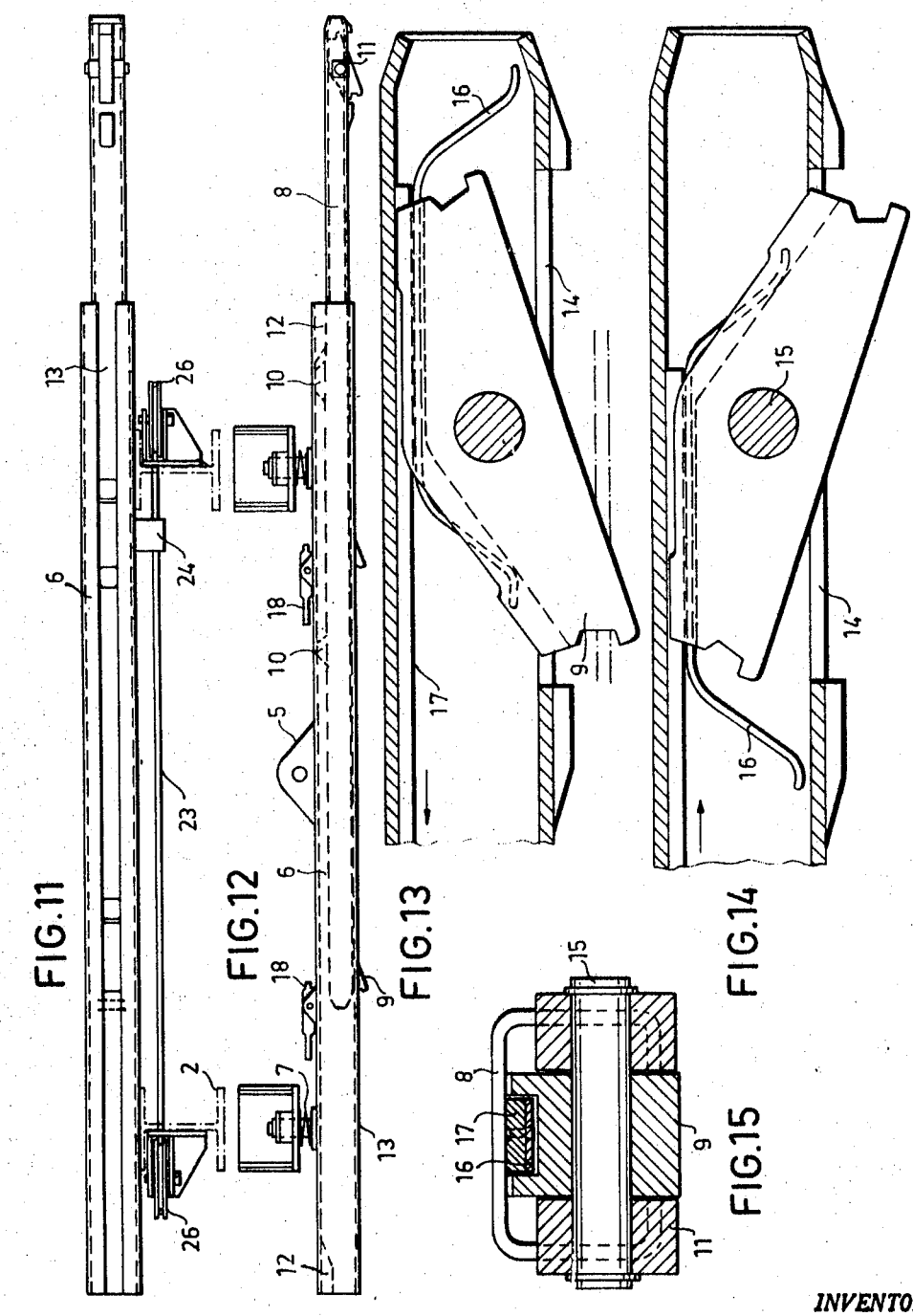

Aug. 5, 1969     J. E. ULIN     3,459,319
RELOADING MECHANISM ON ROAD TRANSPORT VEHICLES
FOR STANDARD LOADS
Filed June 23, 1967     10 Sheets-Sheet 5
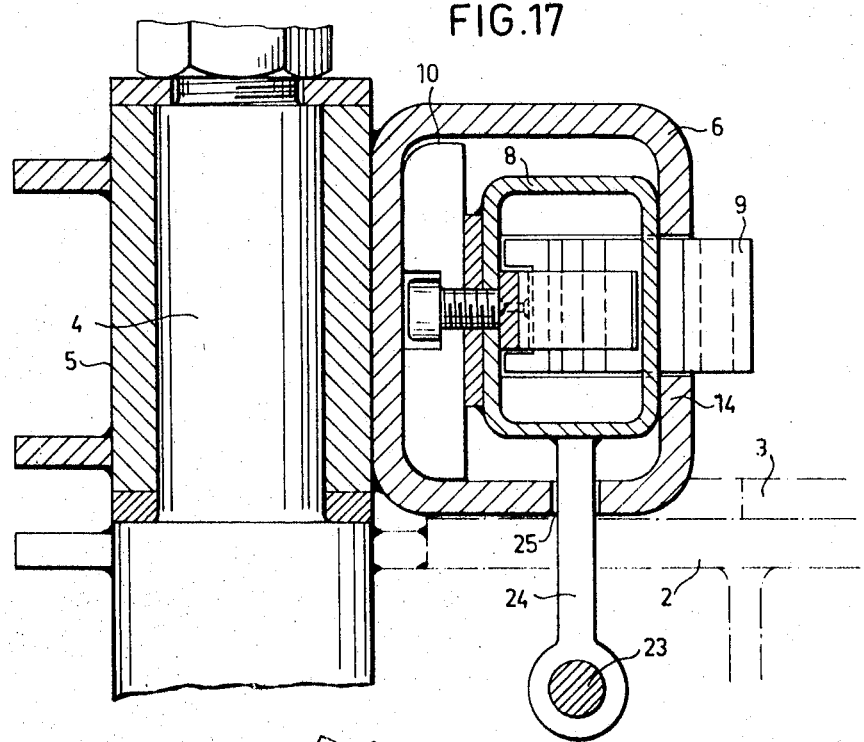
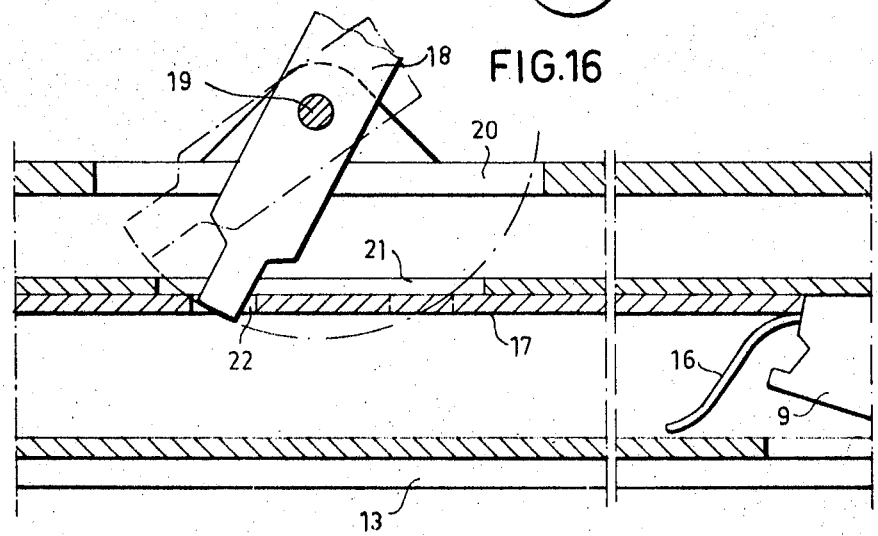
INVENTOR.
JOHAN EMIL ULIN
BY
Young + Thompson
ATTYS.

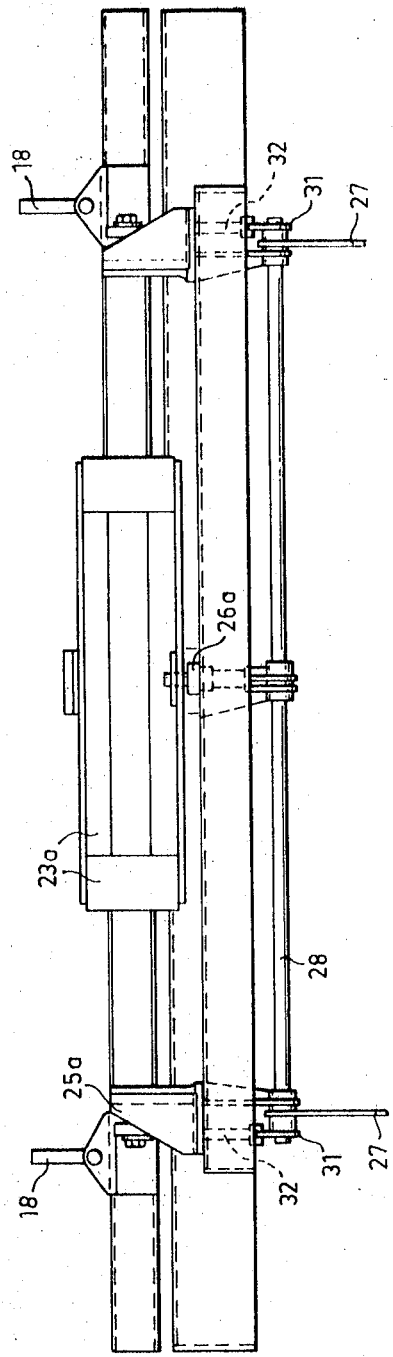

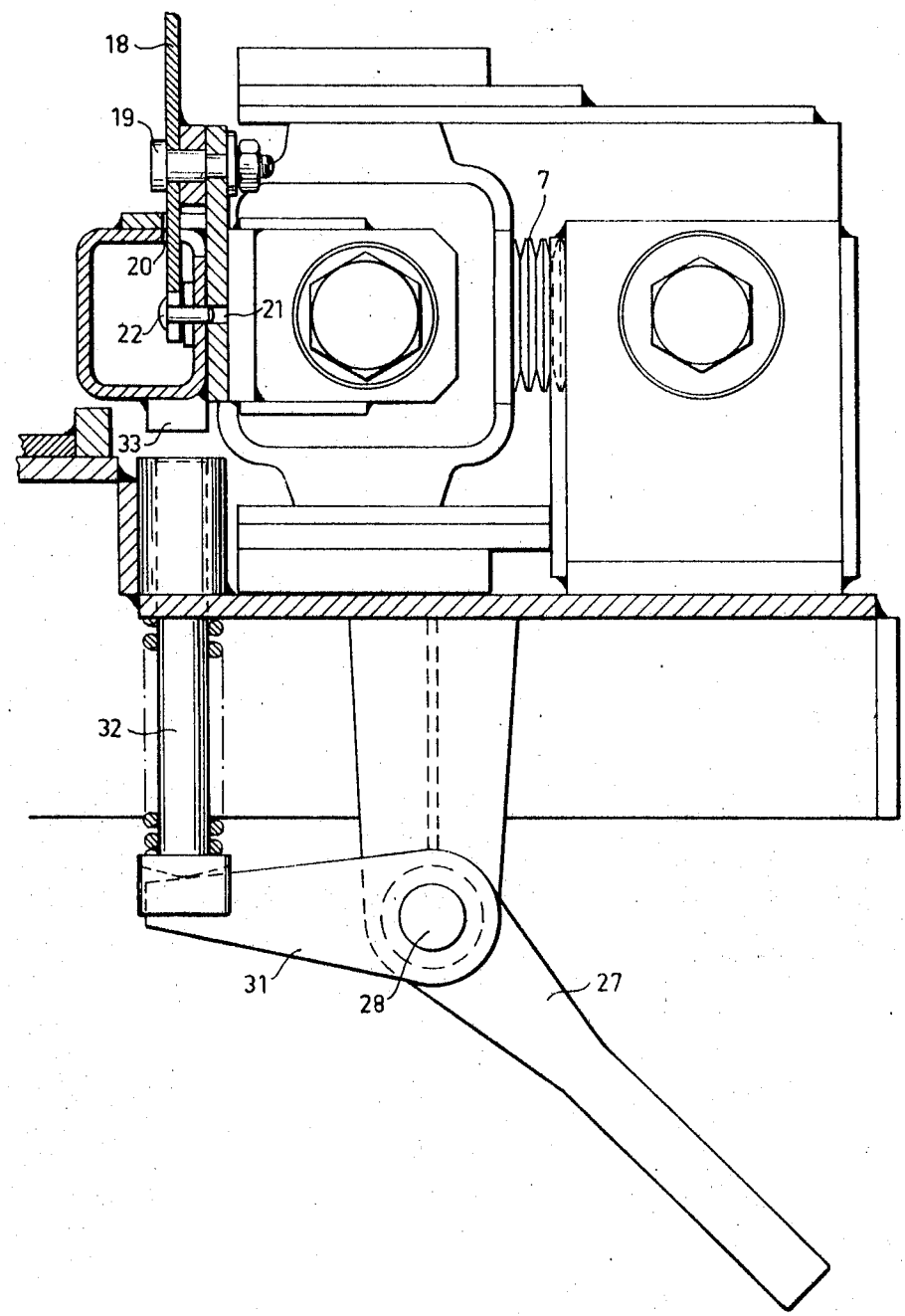

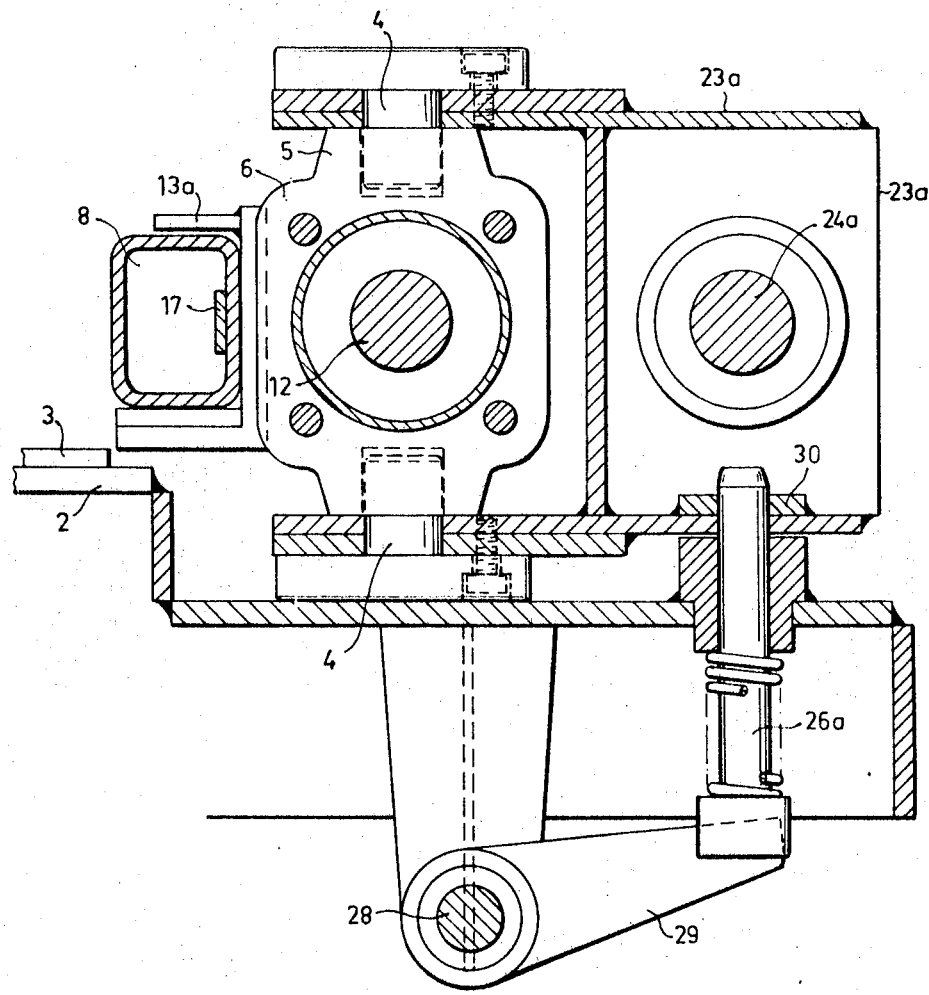

United States Patent Office 3,459,319
Patented Aug. 5, 1969

3,459,319
RELOADING MECHANISM ON ROAD TRANSPORT VEHICLES FOR STANDARD LOADS
Johan Emil Ulin, Orebro, Sweden, assignor to AB Trapco, Orebro, Sweden, a corporation of Sweden
Filed June 23, 1967, Ser. No. 648,422
Claims priority, application Sweden, Aug. 10, 1966, 10,833/66
Int. Cl. B60p 1/64; B65g 67/00
U.S. Cl. 214—516                                    9 Claims

ABSTRACT OF THE DISCLOSURE

A reloading mechanism on road transport vehicles for standard loads, especially deck bodies or goods containers, having a pair of arms extending transversely of the vehicle protrusible in their longitudinal directions on either side of the standard load. Each of the arms provided, on the side intended to face the load, with a plurality of at least two entraining members adapted to engage into recesses or corner fittings of the standard load for reloading the same.

---

Figure 1:
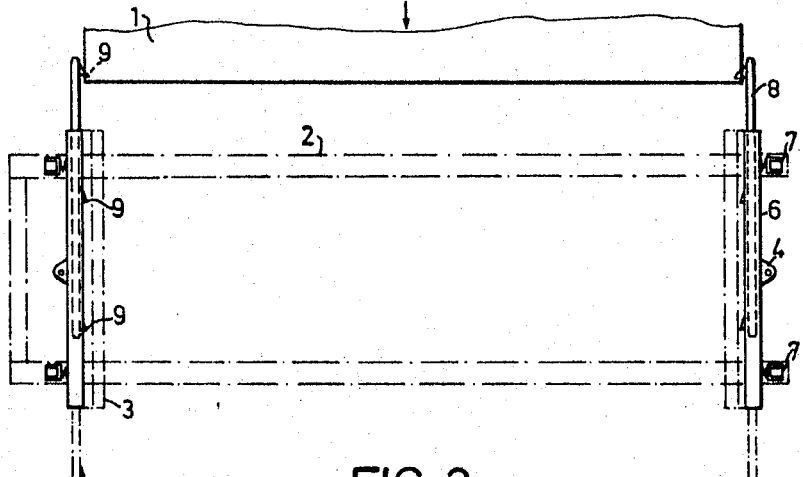

This invention relates to a reloading mechanism on road transport vehicles for standard loads which means deck bodies or goods containers, the latter preferably in the form of rectangular parallelepipeds usually of standard size and adapted to be transported onboard a ship or by land on open railway trucks or road transport vehicles and also adapted for economic utilization of the loading capacity of the road transport vehicles, especially with regard to the length, height and width permissible in road transportation. A length of 6 m. and a width and height of 2.5 m. have been suggested as suitable standard dimensions of such containers. It has also been suggested to provide standard deck bodies or standard containers with recesses or holes in the end walls or the like preferably near the corners and optionally also at the middle of each edge of the end wall, which recesses may serve as fastening means for lifting hooks if the container is to be handled by a hoisting crane.

The object of the invention is to provide a road transport vehicle with an improved mechanism for reloading such standard loads as deck bodies or containers without the necessity of other auxiliaries. Another object is to provide a reloading mechanism by means of which such standard loads can be transferred from the platform of the vehicle to a loading platform, another road transport vehicle or an open railway truck placed alongside of the vehicle as well as in the direction from such a loading platform to the vehicle.

The reloading mechanism according to the invention is characterized by a pair of arms extending transversely of the vehicle and protrusible in their longitudinal directions on either side of a standard load in form of a deck body or container placed alongside of the vehicle on a level with the platform of the vehicle, each of said arms being provided, on the side intended to face the deck body or container, with a plurality of at least two entraining members one of which is disposed at or near one end and another at or near the other end of the arm and the remaining entraining members, if any, being substantially equally spaced between the ends of the arms, said members being adapted to engage into said recesses or corner fittings for reloading of the standard deck body or container. The protrusible arms have a length at least equal to the width of the container or the like, said arms being outwardly displaceable in their longitudinal directions and guided in individual guides adapted to be turned about pivots extending at right angles to the platform of the vehicle, the turning movement being limited by preferably elastic means which in the absence of external forces on the guides are able to return the guides into their operative positions transversely of the chassis of the vehicle, and further characterized by a driving motor and a clutch device connecting the motor to power transmission means for imparting to said arms a required number of repeated reciprocating movements.

The required number of entraining members or hooks on each arm is dependent on the number of recesses or corner fittings in the end walls of the standard container or the like and on the stroke of the reciprocating arms. If three recesses are provided, one at each corner of the end wall and, as also suggested, the third along the edge of the end wall between the corners, there are required at least two hooks disposed one at each end of the arm. If recesses are provided at the corners only of the end walls of the container or the like, there are required at least three hooks, one at each end and one midway of the arms. In order to ensure that the hooks will reliably cooperate with the recesses the stroke of the reciprocating arms has to be at least equal to and preferably slightly greater than the spacing of the hooks. If for practical reasons this condition can not be fulfilled with a minimum number of hooks, the number of hooks has to be increased until the last-named requirement is met.

Figure 2:
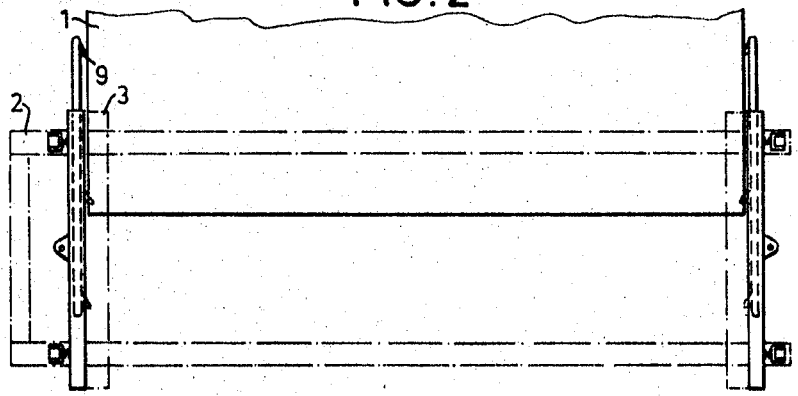
Figure 3:
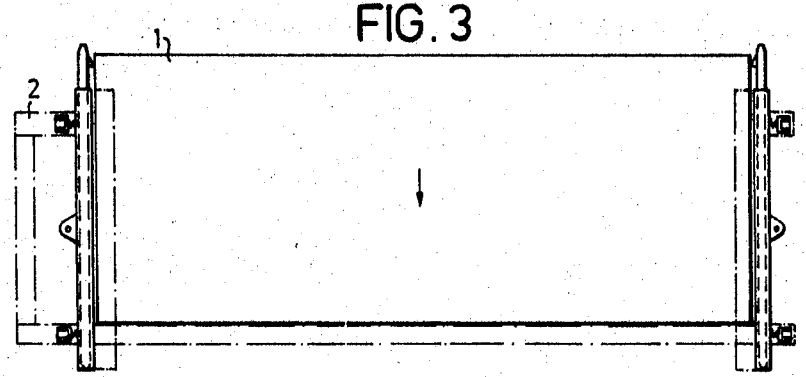
Figure 18:
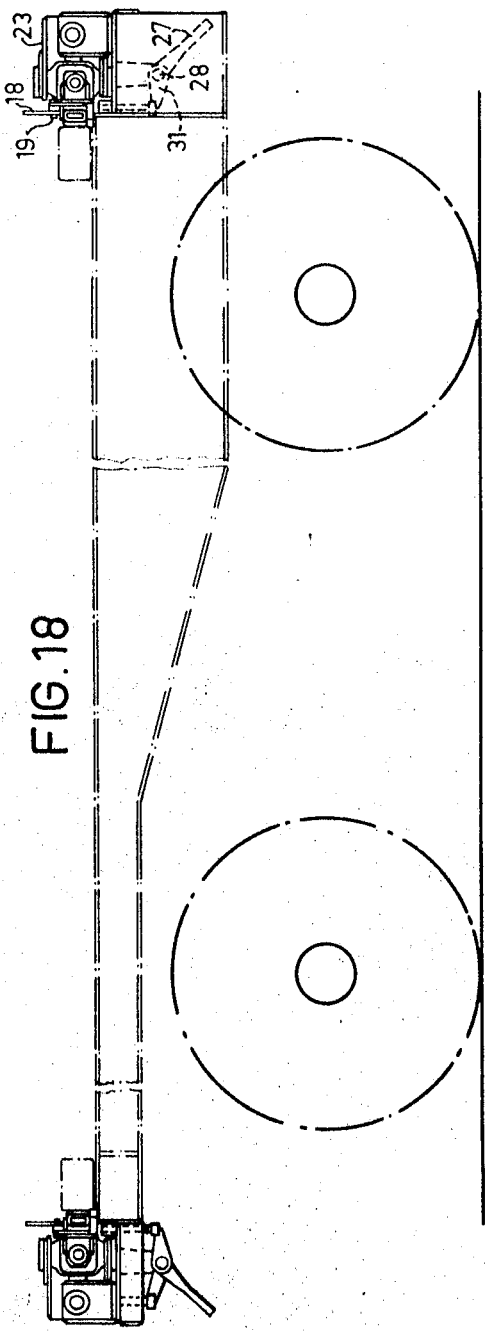
Figure 19:
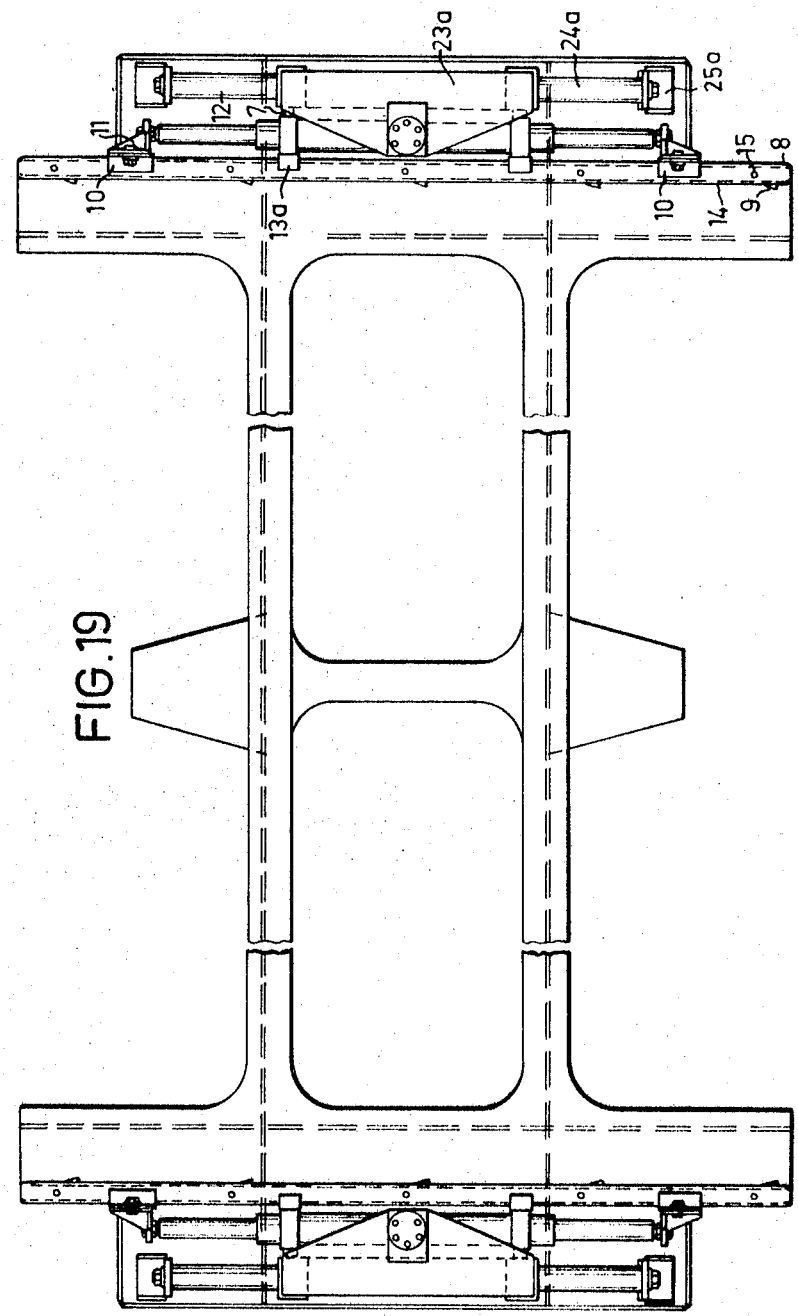

A mechanism according to the invention is illustrated in the annexed drawings in which FIGS. 1–3 are plane views of a truck chassis provided with a mechanism according to the invention, said figures illustrating different steps of displacement of a standard container from a loading platform to the vehicle. FIGS. 4–10 are end views of the same truck chassis and mechanism according to the invention placed alongside of a loading platform in different positions during displacement of the standard container from the loading platform to the truck chassis. FIG. 11 is an enlarged detail of an embodiment of the mechanism shown in FIGS. 4–10 as viewed from between the arms and at right angles to the longitudinal direction of the chassis. FIG. 12 is a plan view of the detail shown in FIG. 11. FIGS. 13 and 14 are enlarged horizontal sectional views of the outer end of the arm shown in FIGS. 11 and 12 in different working positions. FIG. 15 is a cross section as viewed in the direction of the arrows in FIG. 14. FIG. 16 is an enlarged horizontal sectional view of the device shown in FIG. 12 and explains the function of a device for shifting the hooks to opposite working positions. FIG. 17 is an enlarged cross-sectional view of the device shown in FIG. 12 taken along a vertical plane through the longitudinal axis of the chassis and illustrates the mounting of an arm by means of a guide on a pivot pin secured to the chassis. FIGS. 18, 19 and 20 illustrate a lateral elevation, top view and end view, respectively, of a more developed embodiment of the mechanism shown in FIGS. 1–10. FIGS. 21 and 22 illustrate an enlarged end view and cross section, respectively, of arms and appertaining guide means in the embodiment shown in FIG. 18–20.

A mechanism according to the invention and its mode of operation will appear from FIGS. 1–10. FIGS. 1 and 4 illustrate a standard container 1 having lugs or recesses, corner fittings, at each end wall for lifting hooks and standing on a loading platform to the left, as viewed in FIG. 4, of a truck provided with a mechanism according to the invention, the truck being represented by a chassis 2 and slide rails 3 mounted thereon. The slide rails are intended to support standard containers and extend throughout the width of the truck which width usually is equal to the width of the standard container.

The mechanism comprises a pair of pivot pins 4 which are secured to the chassis and extend at right angles upwardly above the load supporting planes of the slide rails.

Mounted on the pivot pins for turning movement are hubs 5 and guides 6 secured to the hubs. The turning movement of each guide is limited by two spring devices 7 which, if the guide is not acted upon by an external force, maintain the guide in its normal working position parallel to the slide rails 3 and, consequently, at right angles to the longitudinal direction of the chassis and standard container. In these positions the guides permit free passage of the container between the guides. The spring devices 7 may consist of pistons acting on an elastic medium or the like.

Mounted in each guide is a straight arm 8 which is selectively displaceable partly outside the guide longitudinally thereof in either of two opposite directions. The length of the arm 8 is substantially equal to the length of the guide 6. The arm is provided with three fluke-like hooks 9 two of which are disposed near the ends of the arm and the third is disposed midway of the arm. The hooks project inwardly beyond the guides 6 sufficiently far to enter into and find hold in recesses at the lower corners of the end walls of the container if the arms 8 have been displaced outwardly sufficiently far from their central positions to enable this function.

Connected to the arms are suitable power transmission means and coupling devices for engaging and disengaging a driving motor provided in the chassis. If the driving motor is coupled to the arms they will be actuated simultaneously and selectively displaced outwardly from their entirely retracted central positions to either of their outer working position and thereupon reciprocated between the two outer end positions as shown in FIGS. 1, 2, 5 and 6.

After the vehicle has been placed in such a position with respect to the standard container that the arms 8 can be protruded on both sides of the container and after the vehicle or the slide rails by means of conventional devices have been moved to a suitable level with respect to the lower edge of the end wall of the standard container, as shown i.e. in FIG. 4, the mode of operation of the mechanism for transferring the container from the loading platform or wharf to the vehicle is as follows.

The arms are reciprocated as mentioned above. To begin with they move from their central positions to the left against the container, as indicated by the arrow in FIG. 4, and continue this movement until they arrive at their left-hand end positions. Depending on the distance between the container and the vehicle the outer hooks 9 pass over and more or less beyond the attachment holes or recesses at the nearest lower corners of the end walls of the container. Then the arms move from their left-hand end positions to their right-hand end positions. During this movement the outer hooks 9 will pass again over said attachment holes and due to their fluke-like form and under the action of the spring devices they will enter into the holes or recesses and act to pull the container. As a result the container will be moved to the right through a distance which corresponds to the remaining part of the stroke of the reciprocating arms.

The displacement through the last named distance is illustrated in FIG. 5 in which the starting positions of the standard container 1 and the arms 8 are shown in chain-dotted lines and the end positions in which the arms are in their right-hand end positions are shown in full lines.

Thereupon the arms return to their left-hand end positions and during this movement the hooks 9 which have been operative during the first step of displacement release their hold of the container which now partly rests on the slide rails of the vehicle.

The second step of displacement starts after the arms 8 during renewed movement from the left to the right are in positions in which the central hooks 9 enter into the attachment holes or recesses at the lower corners of the nearest end wall of the container. This position is best seen from FIG. 2. The displacement during the second step corresponds to the full stroke of the reciprocating arms and is illustrated in FIG. 6 in a manner similar to FIG. 5. Now the greater part of the container rests on the vehicle and can be completely transferred thereto in a third step of displacement.

The third step of displacement begins when the hooks at one end of each arm during the third return movement from the left-hand end position come into positions for entering into the corresponding attachment holes at the corners of the container, as is shown in FIG. 3. The displacement during this last step will appear from FIG. 7. After the container has arrived in its final position on the slide rails 3 the movement of the arms to the right is stopped. If the outer hooks 9 are suitably shaped and placed the arms will stop in their central positions in which they are completely retracted in their respective guides.

Figure 10:
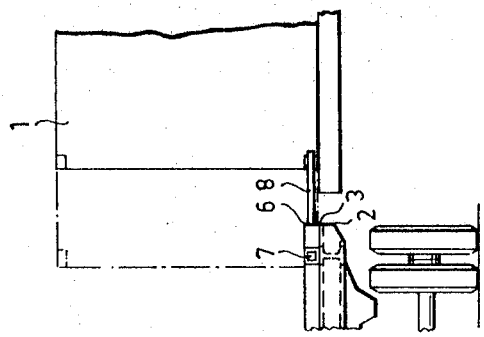
Figure 9:
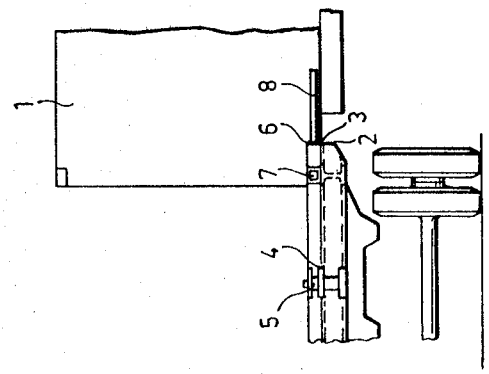
Figure 8:
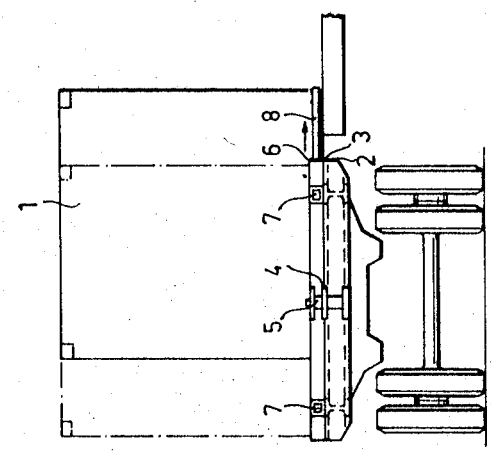

Transferring of the container from the vehicle provided with the mechanism according to the invention to another loading platform can be effected by the same mechanism in three displacement steps in a manner similar to that described above. During the reciprocating movements of the arms the hooks 9 will still act to move the container from the left to the right to a loading platform disposed to the right of the vehicle, as illustrated in FIGS. 8–10.

While the mechanism described can operate in the manner indicated with the entraining members in the form of fluke-like hooks rigidly secured to the arms 8, it is advantageous to have the entraining members protrusibly retracted in the arms and to keep them in protruding gripping positions by spring devices.

A further development of the last named embodiment is shown in FIGS. 11–17. Both the guide 6 and the arm 8 are of hollow rectangular cross section. The arm is displaceably mounted in the cavity of the guide and is guided by slide shoes 10 and 11 and guide surfaces 12. In the neutral position the arm is entirely retracted in the guide. The guide 6 is open at both ends to permit outward displacement of the arm in either direction longitudinally of the guide. Further, the guide has a slot 13 which extends the full length of the guide and is located on the side of the guide intended to face the standard container. The arm has openings 14 corresponding to the slot 13. The hooks 9 which are mounted on pivot pins 15 can be turned outwards through the slot into engagement with the recesses in the end walls of the container.

The fluke-like hooks are symmetric with respect to the pins 15 such that the part of each hook which in one direction of movement of the arm takes hold of the container will be retracted when the other part is protruding. To this end each hook is acted upon by a spring 16 secured to a rod 17 which is displaceable longitudinally of the arm and adapted to be shifted to either of two end positions. One of these end positions is shown in FIG. 13 and the other one in FIG. 14.

Shifting is effected by means of a lever 18, FIGS. 12 and 16, which is mounted for turning on a pivot pin 19. Oblong through-openings 20 and 21 are provided in the guides and arms, respectively, on the side remote from the container. If the arms are in their central positions these openings are registering with each other and located opposite to the pin 19, as shown in FIG. 16. The rod 17 has a slot or recess 22 which in the central positions of the arms is accessible for cooperation with the lever 18 through the openings 20 and 21 and in this position is located at one or the other end of the openings depending on the working positions of the hooks.

From FIG. 16 it will be seen that the openings 20 and 21 and the recess 22 are registering with each other when the rod 17 is in its left-hand end position in which the hooks 9 act to move the container from the left to the right. Shifting to the opposite direction is effected by turning the engaging end of the lever 18 downwards into engagement with the recess 22. Upon continued movement the rod 17 will be displaced into its right-hand end position whereupon the lever 18 can be turned upwards into the neutral position shown in FIG. 12 which is opposite to the position from which the shifting position has been started.

The enlarged cross-sectional view shown in FIG. 17 and taken centrally of the guide according to FIGS. 11 and 12 illustrates the mounting of the guide 6 on a pivot pin 4 secured to the chassis 2 as well as the device for power transmission to the arm 8 as indicated in FIG. 11.

Power is transmitted by means of a flexible steel wire 23 or the like which is connected to the arm 8 by a wire fastening 24. If as illustrated the wire is located below and entirely outside the guide a longitudinal slot 25 of a length corresponding to the stroke of the arm is required on the lower side of the guide to form a passage for the wire fastening. If the guide sheaves 26 shown in FIG. 11 are suitably arranged it is possible to dispose the wire fastening exclusively in the hollow of the guide in which case the rope passes through the end openings of the guide.

An embodiment including a hydraulic power transmission is illustrated in FIGS. 18–22 in which the same reference numerals are employed for parts corresponding to parts described above.

The guides 6 are in the form of hydraulic cylinders 6 having hubs 5 for pins 4. Spring devices 7 act to maintain the cylinders in their normal working positions transversely of the longitudinal direction of the chassis 2.

The arms 8 which are of hollow rectangular cross section and house hooks 9 of substantially the same construction as illustrated in FIGS. 13–16, are by means of fastening devices 10, 11 secured to both ends of the respective piston rods 12 and are guided by slide surfaces 13a provided on the cylinders 6.

If in view of the permissible maximum width of the chassis the stroke of the piston rod of the hydraulic cylinder cannot be at least equal to the spacing of three hooks it is necessary to provide five hooks for each arm.

The sides of the arms intended to face the container have openings 14 through which the hooks 9 which are mounted on pins 15 can protrude. By means of springs 16 secured to pull rods 17 shown in FIGS. 13–16 the hooks are maintained in either of their working positions.

Shifting of the hooks from one working position to the opposite working position is effected by displacing the rod 17 longitudinally of the arms by turning the lever 18 about its fulcrum pin 19 such that the engaging end of the lever projecting through the opening 20 into the cavity of the arm will act upon a pivot 22 secured to the rod 17 and guided in a longitudinal groove 21.

A piston rod stroke which is at least equal to the spacing of five hooks is rendered possible by displacing the hydraulic cylinder 6 towards the side of the chassis from which or toward which the container is to be moved. To this end the pins 4 and the spring devices 7 are secured to a block 23a which is displaceably mounted on a guide 24a extending parallel to the longitudinal direction of the arms. The guide 24a is secured to the chassis 2 by fastenings 25a.

The block 23a and, consequently, the hydraulic cylinder 6 can be locked in either end position to the guide 24a by means of a lock pin 26a under the action of one of two levers 27 which are secured to each other by a shaft 28. If the shaft is turned by lifting the lever 27 a lifting arm 29 forces the lock pin 26a upwards into engagement with one of two recesses 30 on the lower side of the block 23a, which recesses correspond to the two end positions, whereupon the hydraulic cylinder is locked in the end position to which it has been displaced.

The shaft 28 is also secured to two lifting arms 31 which upon downward movement of the lever 27 can force associated lock pins 32 upwardly into engagement between a pair of projections 33 on the lower sides of the arms if the arms are in their central or transporting positions.

From the above it wil be seen that the lock pins 26a and 32 only alternatively can be in their locking positions and never simultaneously.

The mode of operation of this mechanism is as follows.

In the transporting position shown in FIGS. 18–20 the arms 8 are locked due to engagement of the upwardly forced lock pins 32 with the projections 33. If a standard container is to be transmitted, such as from a railway truck to the slide rails 3 on the chassis 2, and the vehicle has been suitably placed with one of its sides alongside of the railway truck, fluid under pressure is supplied to the hydraulic cylinders on the side of the hydraulic pistons close to the railway truck. Since each hydraulic piston is stationary with respect to the vehicle, the hydraulic cylinders and the blocks 23a will be moved to the working positions close to the railway truck. In this position the lever 27 is turned upwardly into the position shown in FIG. 21 in which the arms 8 are released. At the same time the lock pin 26a is forced upwards into engagement with the recesses 30 and lock the blocks and the hydraulic cylinders as shown in FIG. 22.

By supplying fluid under pressure alternately to one and the other side of the hydraulic piston the arms will be reciprocated and the standard container transferred in the manner already described. The stroke of the arms has been elongated by an amount which corresponds to the displacement of the hydraulic cylinders from their central positions to the working positions close to the railway truck.

What I claim is:

1. Reloading mechanism on road vehicles having platforms for transporting standard loads having attachment fittings in their end walls, comprising a pair of arms extending transversely of the vehicle and movable in their longitudinal directions on either side of the load when the load is placed alongside of the vehicle on a level with the platform of the vehicle, each of said arms having on the side facing the load at least two entraining members one of which is disposed adjacent one end and another adjacent the other end of the arm, said entraining members comprising fluke-like hooks extensible and retractable in the arms and spring devices for maintaining said entraining members in gripping positions for engagement in said fittings for reloading of the load, and individual guides which are pivotally mounted about pivots extending at right angles to said platform of said vehicle, said arms being guided in said guides.

2. A mechanism as claimed in claim 1, in which said arms have a length at least equal to the width of the load, and in which said pivotal movement of said guides is limited by elastic means which in the absence of external forces on the guides are able to return the guides to their operative positions transversely of said vehicle, a driving motor, and a clutch device connecting the motor to power transmission means for imparting to said arms a required number of repeataed reciprocating movements.

3. A mechanism as claimed in claim 2, in which said arms are hollow and a pull rod is mounted in the cavity of each arm and is displaceable longitudinally of the arm and secured to springs each of which is in engagement with the back side of an appertaining hook, said rod being adapted to displace said springs thereby to shift all of the hooks at the same time.

4. A mechanism as claimed in claim 3, in which said arms are of rectangular cross section and said pull rods are flat.

5. A mechanism as claimed in claim 3, in which said guides and said arms are hollow, said arms being mounted in the hollows of said guides by means of guide shoes and guide surfaces and being in their central positions entirely enclosed in the guides except for through-openings at the ends of said guides and except for a longitudinal slot in each guide which slot extends throughout the length of said guide on the side of said guide facing the load for permitting said hooks to project outwardly for engagement with said end wall fittings of said load and except for openings for connecting said arms to said power transmission means.

6. A mechanism as claimed in claim 5, in which said arms are of rectangular cross section.

7. A mechanism as claimed in claim 5, in which said guides and the sides of said arms remote from said load have oblong through-openings registering with each other in the central positions of said arms, said pull rod having a recess for shifting the hooks, said recess being accessible in the central position of said arm through both of said oblong through-openings and located on that occasion at one of the ends of said openings according to the positions of said hooks, and a double lever pivotally mounted outside said guide and opposite to said through-opening in the guide for pivotal movement when said arms are in their central positions, so as to enter said recess in said pull rod and upon continued movement to displace said rod until said recess arrives at the opposite ends of said openings and upon further continued movement in the same direction to be turned out from the through-openings into a neutral position which is opposite to the position from which the shifting movement has started.

8. A mechanism as claimed in claim 1, in which said hooks are fluke-shaped in both directions of movement of said arms and shiftable such that those portions of the hooks which take hold of the load in one of said directions are maintained in retracted positions when the other portions are protruding from the arms.

9. A mechanism as claimed in claim 1, in which each of said movable arms is associated with a double-acting hydraulic cylinder parallel to said arm and serving as a guide and power transmission means and having a through piston rod secured at its ends to the respective said arm, said cylinder being connected via change-over means to a motor-driven pump for alternative supply of fluid under pressure to one or the other side of the hydraulic piston and mounted on at least one pivot with the turning movement limited by elastically acting members which in the absence of external forces return said hydraulic cylinder to its operative position transversely of the chassis of said vehicle, bearing and return devices extending from a base block which is displaceable on guides in parallel relation to said operative position and lockable in two end positions within the width of said chassis, and locking means for retaining said arms in their central positions if said base blocks together with said hydraulic cylinders are to be moved from their central positions to their end positions or vice versa.

References Cited
UNITED STATES PATENTS

| | | | |
|---|---|---|---|
| 1,560,373 | 11/1925 | Birnstock | 198—221 |
| 2,650,696 | 9/1953 | Gedris | 198—221 |
| 3,283,932 | 11/1966 | Dempster et al. | 214—516 |

ROBERT G. SHERIDAN, Primary Examiner

U.S. Cl. X.R.

198—221